(12) United States Patent
Friend et al.

(10) Patent No.: US 11,705,586 B2
(45) Date of Patent: Jul. 18, 2023

(54) ACOUSTIC WAVE BASED DENDRITE PREVENTION FOR RECHARGEABLE BATTERIES

(71) Applicant: The Regents of the University of California, Oakland, CA (US)

(72) Inventors: James Friend, San Diego, CA (US); An Huang, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/541,744

(22) Filed: Dec. 3, 2021

(65) Prior Publication Data
US 2022/0140408 A1    May 5, 2022

Related U.S. Application Data

(63) Continuation of application No. 16/331,741, filed as application No. PCT/US2017/050704 on Sep. 8, 2017, now Pat. No. 11,196,092.
(Continued)

(51) Int. Cl.
*H01M 10/42* (2006.01)
*H01M 10/44* (2006.01)
(Continued)

(52) U.S. Cl.
CPC ..... *H01M 10/4235* (2013.01); *H01M 10/052* (2013.01); *H01M 10/054* (2013.01);
(Continued)

(58) Field of Classification Search
CPC ......... H01M 10/4235; H01M 10/0587; H01M 10/425; H01M 10/44; H01M 10/48; H01M 2010/4271; H02J 7/0068
(Continued)

(56) References Cited

U.S. PATENT DOCUMENTS 3,923,550 A  *  12/1975  von Krusenstierna ..................... H01M 10/4214
                                                                                                                    429/229
4,329,406 A      5/1982  Dahl et al.
(Continued)

FOREIGN PATENT DOCUMENTS

CN    201210444599    5/2014
JP    H06140078 A    5/1994
(Continued)

OTHER PUBLICATIONS

AA portable power cooperation. http://www.batteryspace.com.
(Continued)

*Primary Examiner* — Nathaniel R Pelton
(74) *Attorney, Agent, or Firm* — Mintz Levin Cohn Ferris Glovsky and Popeo, P.C.

(57) ABSTRACT

A dendrite resistant battery may include a first electrode, a second electrode, and an electrolyte interposed between the first electrode and the second electrode. The dendrite resistant battery may further include at least one acoustic wave device configured to generate a plurality of acoustic waves during a charging of the battery. The charging of the battery may trigger cations from the first electrode to travel through the electrolyte and deposit on the second electrode. The plurality of acoustic waves may agitate the electrolyte to at least homogenize a distribution of cations in the electrolyte. The homogenization of the distribution of cations may prevent a formation of dendrites on the second electrode by at least increasing a uniformity of the deposit of cations on the second electrode. Related methods and systems for battery management are also provided.

19 Claims, 12 Drawing Sheets

Related U.S. Application Data

(60) Provisional application No. 62/518,521, filed on Jun. 12, 2017, provisional application No. 62/385,811, filed on Sep. 9, 2016.

(51) Int. Cl.
  *H01M 10/054* (2010.01)
  *H01M 10/052* (2010.01)
  *H02J 7/00* (2006.01)
  *H01M 10/0587* (2010.01)
  *H01M 10/48* (2006.01)

(52) U.S. Cl.
  CPC ..... *H01M 10/0587* (2013.01); *H01M 10/425* (2013.01); *H01M 10/44* (2013.01); *H01M 10/48* (2013.01); *H02J 7/0068* (2013.01); *H02J 7/0069* (2020.01); *H01M 2010/4271* (2013.01)

(58) Field of Classification Search
  USPC .......................................... 320/134
  See application file for complete search history.

(56) References Cited

U.S. PATENT DOCUMENTS

| | | | |
|---|---|---|---|
| 4,388,583 A | | 6/1983 | Krueger |
| 5,436,548 A | * | 7/1995 | Thomas ............ H01M 10/4214 320/147 |
| 5,629,599 A | | 5/1997 | Malaspina et al. |
| 5,932,991 A | * | 8/1999 | Ahuja ................... H02J 7/0071 429/4 |
| 5,963,008 A | * | 10/1999 | Cordeiro ............... H02J 7/0069 429/52 |
| 6,368,482 B1 | | 4/2002 | Oeftering et al. |
| 2010/0273036 A1 | * | 10/2010 | Marple ............... H01M 50/538 429/94 |
| 2014/0226430 A1 | | 8/2014 | Bloch |
| 2015/0270584 A1 | * | 9/2015 | Saunders .......... H01M 10/4285 324/426 |
| 2020/0106137 A1 | * | 4/2020 | Murphy ............ H01M 10/0525 |

FOREIGN PATENT DOCUMENTS

| | | |
|---|---|---|
| JP | 2010251025 A | 11/2010 |
| JP | 5338442 B2 | 11/2013 |

OTHER PUBLICATIONS

Akolkar, R. "Mathematical model of the dendritic growth during lithium electrodeposition." Journal of Power Sources, 232:23-28, 2013.
Aurbach, D. et al., "The correlation between surface chemistry, surface morphology, and cycling efficiency of lithium electrodes in a few polar aprotic systems." Journal of the Electrochemical Society, 136(11):3198-3205, 1989.
Chan, C.K. et al., "High-performance lithium battery anodes using silicon nanowires." Nature nanotechnology, 3(1):31-35, 2008.
Chang, H.J. et al., "Investigating li microstructure formation on li anodes for lithium batteries by in situ 6li/7li nmr and sem." The Journal of Physical Chemistry C, 2015.
Chazalviel, J.N. "Electrochemical aspects of the generation of ramified metallic electrodeposits." Physical review A, 42(12):7355, 1990.
Croce, F. et al., "A novel concept for the synthesis of an improved lifepo4 lithium battery cathode." Electrochemical and solid-state letters, 5(3):A47-A50, 2002.
Energizer Corporation. http://www.energizer.com.
Friend, J. et al., "Microscale acoustofluidics: Microfluidics driven via acoustics and ultra-sonics." Reviews of Modern Physics, 83(2):647, 2011.
Friend, J. et al., "Ultrasonic characterization of poling in lead zirconate titanate ceramics." Applied Physics Letters, 79(17):2794-2796, 2001.
Harry, K.J. et al., "Detection of subsurface structures underneath dendrites formed on cycled lithium metal electrodes." Nature materials, 13(1):69-73, 2014.
Hitachi Maxell coporation. http://www.maxell.com.
Hu, L. et al., "Graphene-modified lifepo4 cathode for lithium ion battery beyond theoretical capacity." Nature communications, 4:1687, 2013.
Larcher, D. et al., "Recent findings and prospects in the field of pure metals as negative electrodes for li-ion batteries." Journal of Materials Chemistry, 17(36):3759-3772, 2007.
Li, H. et al., "Surface acoustic wave concentration of particle and bioparticle suspensions." Biomedical microdevices, 9(5):647-656, 2007.
Ning, G. et al., "Capacity fade study of lithium-ion batteries cycled at high discharge rates." Journal of Power Sources, 117(1):160-169, 2003.
Orsini, F. et al., "In situ scanning electron microscopy (sem) observation of interfaces within plastic lithium batteries." Journal of power sources, 76(1):19-29, 1998.
Panasonic corporation. http://www.panasonic.com/global/home.html.
Shilton, R. et al., "Particle concentration and mixing in microdrops driven by focused surface acoustic waves." Journal of Applied Physics, 104(1):014910, 2008.
Shiraishi, S. et al., "Surface condition changes in lithium metal deposited in nonaqueous electrolyte containing hf by dissolution-deposition cycles." Journal of the Electrochemical Society, 146(5):1633-1639, 1999.
Tarascon, J.M. et al., "Issues and challenges facing rechargeable lithium batteries." Nature, 414(6861):359-367, 2001.
Universal Power Group. http://upgi.com/products.
Wandt, J. et al., "Operando electron paramagnetic resonance spectroscopy—formation of mossy lithium on lithium anodes during charge-discharge cycling." Energy & environmental science, 8(4):1358-1367, 2015.
White, R.M. et al., "Direct piezoelectric coupling to surface elastic waves." Applied physics letters, 7(12):314-316, 1965.
Wongittharom, N. et al., "Electrochemical performance of rechargeable li/lifepo 4 cells with ionic liquid electrolyte: effects of li salt at 25 c and 50 c." Journal of Power Sources, 240:676-682, 2013.
Yamaki, J. et al., "A consideration of the morphology of electrochemically deposited lithium in an organic electrolyte." Journal of Power Sources, 74(2):219-227, 1998.
Yoshimatsu, I. et al., "Lithium electrode morphology during cycling in lithium cells." Journal of the Electrochemical Society, 135(10):2422-2427, 1988.
Zhang, S.S. "A review on electrolyte additives for lithium-ion batteries." Journal of Power Sources, 162(2):1379-1394, 2006.

\* cited by examiner

ACOUSTIC WAVE BASED DENDRITE PREVENTION FOR RECHARGEABLE BATTERIES

RELATED APPLICATION

This application is a Continuation of Application of Ser. No. 16/331,741 filed Dec. 7, 2021, now U.S. Pat. No. 11,196,092, entitled "ACOUSTIC WAVE BASED DENDRITE PREVENTION FOR RECHARGEABLE BATTERIES," which is a national phase entry of Patent Cooperation Treaty Application No. PCT/US2017/050704 filed Sep. 8, 2017, entitled "ACOUSTIC WAVE BASED DENDRITE PREVENTION FOR RECHARGEABLE BATTERIES," which claims the benefit of priority to U.S. Provisional Patent Application No. 62/385,811 filed on Sep. 9, 2016, entitled "DENDRITE PREVENTION TECHNOLOGY IN RECHARGEABLE BATTERIES TO EXTEND LIFETIME, IMPROVE THEIR SAFETY, AND/OR FACILITATE THE USE OF SUPERIOR MATERIALS FOR BATTERY CONSTRUCTION," and U.S. Provisional Patent Application No. 62/518,521 filed on Jun. 12, 2017, entitled "DENDRITE PREVENTION TECHNOLOGY IN RECHARGEABLE BATTERIES TO EXTEND LIFETIME, IMPROVE THEIR SAFETY, AND/OR FACILITATE THE USE OF SUPERIOR MATERIALS FOR BATTERY CONSTRUCTION," the disclosures of which are incorporated herein by reference in their entirety.

TECHNICAL FIELD

The subject matter disclosed herein relates generally to battery technology and more specifically to dendrite prevention in rechargeable batteries.

BACKGROUND

A battery may convert, through oxidation and reduction, chemical energy into electrical energy, and vice versa. For example, during the discharge of the battery, atoms at an anode (e.g., negative electrode) of the battery may oxidize to form cations (e.g., positively charged ions) and free electrons. The free electrons may migrate from the anode to a cathode (e.g., positive electrode) of the battery, thereby generating an electric current through an external circuit that includes an electric load of the battery. Moreover, the cations may also travel to the cathode through an electrolyte interposed between the anode and the cathode. Meanwhile, to charge the battery, an electric current may be applied to the battery to cause the atoms at the cathode to oxidize and form both cations and free electrons. The free electrons may return to the anode through the external circuit while the cations may travel through the electrolyte in order to return to the anode.

SUMMARY

Articles of manufacture, including dendrite resistant batteries, and methods for preventing dendrites are provided. A dendrite resistant battery may include: a first electrode, a second electrode, an electrolyte, and at least one acoustic wave device. The electrolyte may be interposed between the first electrode and the second electrode. The acoustic wave device may be configured to generate a plurality of acoustic waves during a charging of the battery. The charging of the battery may trigger cations from the first electrode to travel through the electrolyte and deposit on the second electrode. The plurality of acoustic waves may agitate the electrolyte to at least homogenize a distribution of cations in the electrolyte. The homogenization may prevent a formation of dendrites on the second electrode by at least increasing a uniformity of the deposit of cations on the second electrode In some variations, one or more features disclosed herein including the following features can optionally be included in any feasible combination. The plurality of acoustic waves may induce acoustic streaming within the electrolyte. The acoustic streaming may further agitate the electrolyte to homogenize the distribution of the cations in the electrolyte. The homogenization may decrease a concentration gradient of the cations in the electrolyte and increase a uniformity of the distribution of the cations in the electrolyte. The plurality of acoustic waves may include surface acoustic waves, Lamb waves, flexural waves, thickness mode vibrations, mixed-mode waves, longitudinal waves, shear mode vibrations, and/or bulk wave vibrations.

In some variations, the battery may be a cylindrical battery. A separator may be interposed between the first electrode and the second electrode. The first electrode, the second electrode, and the separator may be configured to form a jelly-roll structure. The at least one acoustic wave device may be disposed at a core of the jelly-roll structure.

In some variations, the at least one acoustic wave device may be disposed at a side of the first electrode and/or the second electrode.

In some variations, the at least one acoustic wave device may be disposed above and/or beneath the first electrode and/or the second electrode.

In some variations, the charging of the battery may activate the at least one acoustic wave device to at least generate the plurality of acoustic waves. The at least one acoustic wave device may be inactive during a discharge of the battery.

In some variations, the electrolyte may be a gas and/or a liquid. The battery may be a lithium (Li) battery, a lithium-ion battery, a potassium (K) battery, a magnesium (Mg) battery, a copper (Cu) battery, a zinc (Zn) battery, a sodium (Na) battery, and/or a potassium (K) battery. The first electrode and/or the second electrode may be a metal electrode, a cation-intercalated composite electrode, an air electrode, a graphite electrode, a graphene electrode, a lithium-intercalated carbon electrode, a lithium-intercalated silicone electrode, a sulphur electrode, a tungsten electrode, a silicon electrode, a nitride electrode, a vanadium oxide electrode, and/or a lithium excess electrode.

In some variations, the at least one acoustic wave device may include a transducer deposited on a substrate. The transducer may be configured to respond to an electrical input signal by at least applying tension and compression within and/or upon the substrate. The substrate may respond to the tension and the compression by at least oscillating to generate the plurality of acoustic waves. The transducer may include one or more pairs of interdigital transducers, a layer of conductive material, and/or one or more contact pins. The substrate may be formed from at least a piezoelectric material. The piezoelectric material may be lithium niobate ($LiNbO_3$), lithium titanate ($Li_2TiO_3$), barium titanate ($BaTiO_3$), lead zirconate titanate ($Pb(Zr_xT_{1-x})O_3$ wherein ($0 \leq x \leq 1$)), quartz, aluminum nitride (AlN), and/or polyvinylidene fluoride (PVDF).

In some variations, a frequency of the plurality of acoustic waves may correspond to an attenuation length of the plurality of acoustic waves. The attenuation length may correspond to one or more dimensions of the battery, the first electrode, and/or the second electrode.

In some variations, the battery may further include a separator. A pore size of the separator may be greater than and/or equal to one half a wavelength of the plurality of acoustic waves.

In some variations, the plurality of acoustic waves may have an amplitude that preserves a solid electrolyte interface layer formed on a surface of the first electrode and/or the second electrode.

In some variations, the plurality of acoustic waves may be at least partially reflected off a surface of the first electrode and/or the second electrode. The acoustic wave device may be further configured to detect a feedback signal corresponding to the reflection of the plurality of acoustic waves. The battery may be coupled with a controller. The controller may be configured to: determine, based at least on the feedback signal, a morphology of an interior of the battery; and control, based at least on the morphology, an operation of the battery. The controller may be configured to terminate the operation of the battery in response to the feedback signal indicating a presence of dendrites and/or air bubbles on the surface of the first electrode and/or the second electrode. The controller may terminate the operation of the battery by at least electrically decoupling the battery from an electric load of the battery and/or another battery in a same battery array.

A method for operating a battery may include: receiving a feedback signal responsive to one or more acoustic waves, the one or more acoustic waves generated by an acoustic wave device comprising a battery, and the feedback signal corresponding to at least a partial reflection of the one or more acoustic waves formed by one or more electrodes comprising the battery; determining, based at least on the feedback signal, a morphology of an interior of the battery; and controlling, based at least on the morphology of the interior of the battery, an operation of the battery.

In some variations, the controlling of the operation of the battery may include terminating the operation of the battery in response to the feedback signal indicating a presence of dendrites and/or an air bubble on the surface of the one or more electrodes. The controlling the operation of the battery may further include terminating the operation of the battery in response to the feedback signal indicating a presence of detached dendrites, a breakage in a solid electrolyte interface layer, and/or a formation of a protective polymer layer on the acoustic wave device. The termination of the operation of the battery may include electrically decoupling the battery from an electric load of the battery and/or from another battery in a same battery array. The one or more acoustic waves may be generated, by the acoustic wave device, during a discharge of the battery.

In some variations, a plurality of acoustic waves may be generated by the acoustic wave device during a charging of the battery. The charging of the battery may trigger cations from a first electrode to travel through an electrolyte comprising the battery and deposit on a second electrode. The plurality of acoustic waves may agitate the electrolyte to at least homogenize a distribution of cations in the electrolyte. The homogenization may prevent a formation of dendrites on the second electrode by at least increasing a uniformity of the deposit of cations on the second electrode. The plurality of acoustic waves may induce acoustic streaming within the electrolyte. The acoustic streaming may further agitate the electrolyte to homogenize the distribution of the cations in the electrolyte The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a rechargeable battery, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

When practical, similar reference numbers denote similar structures, features, or elements.

DETAILED DESCRIPTION

The charging of a battery may cause the formation of dendrites. For example, charging a lithium (Li) metal battery may cause the formation of lithium dendrites at the anode of the battery as lithium ions returning to the anode from the cathode form irregular, mossy deposits on the anode. The formation of dendrites may gradually reduce the battery's discharge capacity. Furthermore, the dendrites forming on the anode may eventually come in contact with the cathode and cause an internal short within the battery. As such, in some example embodiments, a battery may include an acoustic wave device. The acoustic wave device may prevent the formation of dendrites by at least generating, during the charging of the battery, acoustic waves. These acoustic waves may agitate the electrolyte within the battery via, for example, non-linear interaction with the electrolyte, acoustic streaming, quartz wind, and/or the like. Agitation of the electrolyte may homogenize the distribution of the cations in the electrolyte as the cations migrate from the cathode to the anode. Meanwhile, homogenizing the distribution of cations in the electrolyte may decrease the concentration gradient of the cations in the electrolyte such that the cations are distributed more evenly throughout in the electrolyte. As such, homogenizing the distribution of cations in the electrolyte may increase the uniformity of the deposits of cations on the anode and/or the extraction of anions from the cathode.

Figure 1A:
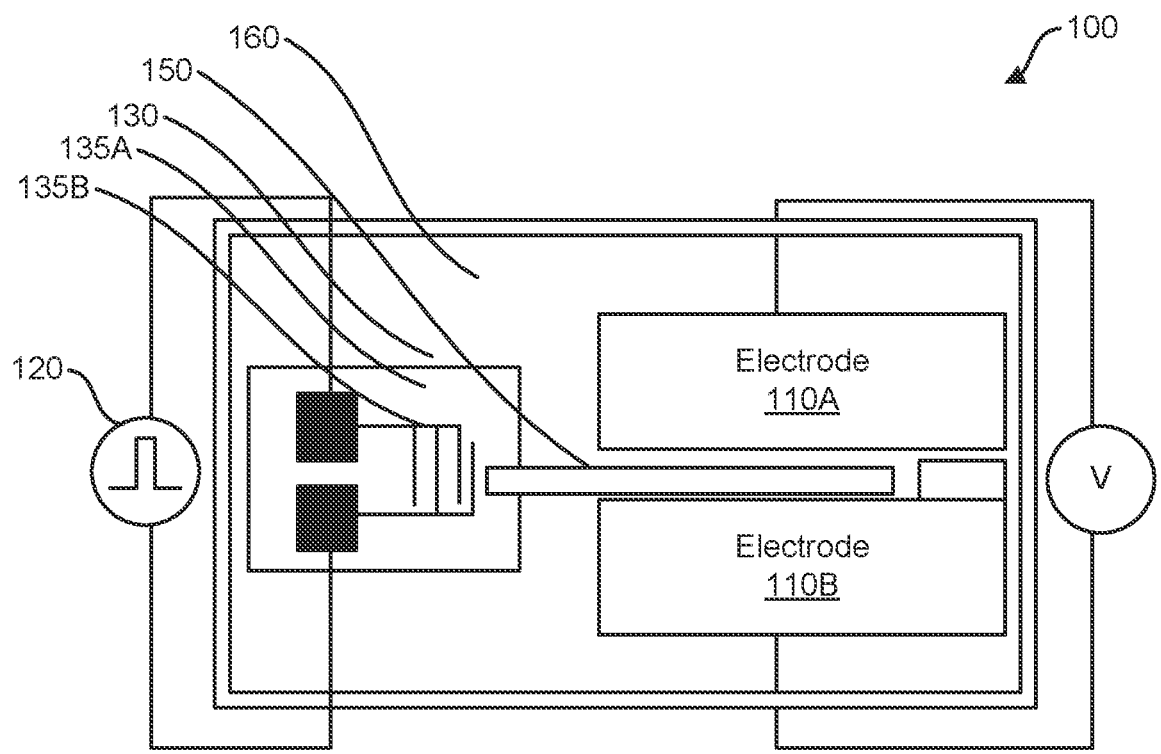
FIG. 1A depicts a battery, in accordance with some example embodiments.
Figure 1B:
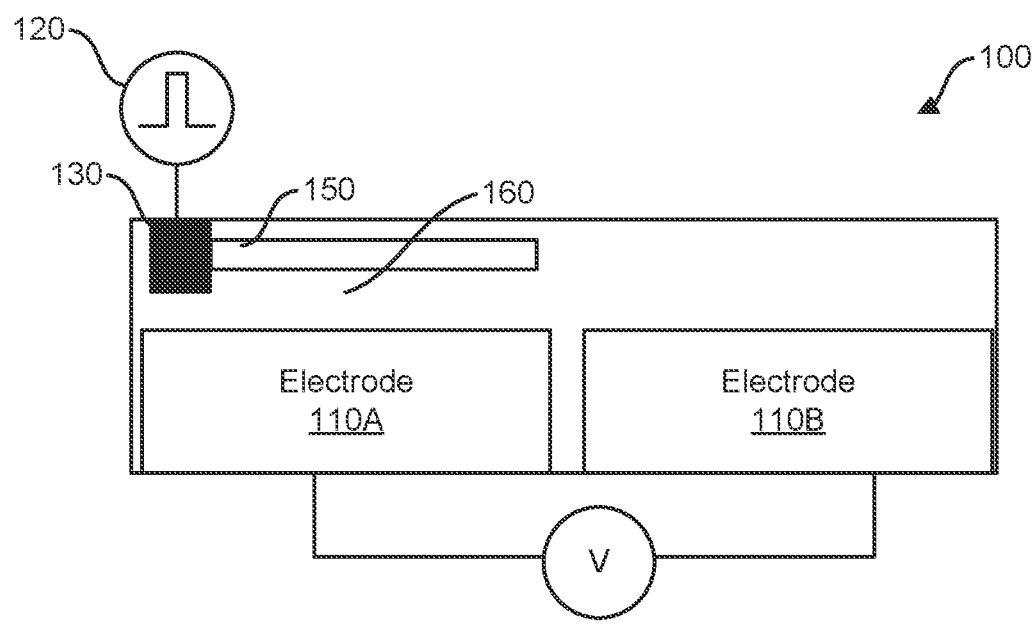
FIG. 1B depicts an alternative configuration for a battery, in accordance with some example embodiments.

FIGS. 1A-B depict a battery 100, in accordance with some example embodiments. The battery 100 may be any type of battery including, for example, a lithium (Li) battery, a sodium (Na) battery, a potassium (K) battery, a copper (Cu) battery, a zinc (Zn) battery, a magnesium (Mg) battery, a lithium ion battery, and/or the like. Referring to FIGS. 1A-B, the battery 100 may include a first electrode 110A and a second electrode 110B. The first electrode 110A and the second electrode 110B may have opposite polarity. For example, the first electrode 110A may be an anode of the battery 100 while the second electrode 110B may be a cathode of the battery 100. Alternatively and/or additionally, the first electrode 110A may be the cathode of the battery 100 while the second electrode 110B may be the anode of the battery 100. It should be appreciated that the first electrode 110A and/or the second electrode 110B may be any type of electrode that undergoes electrochemical reaction during a charge and/or discharge of the battery 100 including, for example, a metal electrode, a cation-intercalated composite electrode, an air electrode, a graphite electrode, a graphene electrode, a lithium-intercalated carbon electrode, a lithium-intercalated silicone electrode, a sulphur (S) electrode, a tungsten (W) electrode, a silicon (Si) electrode, a nitride electrode, a vanadium oxide electrode, a lithium excess electrode, and/or the like.

In some example embodiments, the battery 100 may further include one or more acoustic wave devices, which may be disposed at various locations within and/or upon the interior of the battery 100. For example, the battery 100 may include an acoustic wave device 130. FIG. 1A depicts one configuration of the battery 100 in which the acoustic wave device 130 is disposed to one side of the first electrode 110A and/or the second electrode 110B. Furthermore, the acoustic wave device 130 may be oriented perpendicularly relative to the first electrode 110A and/or the second electrode 110B. Alternatively and/or additionally, FIG. 1B depicts an alternative configuration for the battery 100 in which the acoustic wave device 130 is disposed above the first electrode 110A and/or the second electrode 110B. In this configuration, the acoustic wave device 130 may have a parallel orientation with respect to the first electrode 110A and/or second electrode 110B.

It should be appreciated that the acoustic wave device 130 may be disposed at a different location and/or have a different orientation than shown in FIGS. 1A-B. For instance, the acoustic wave device 130 may be disposed beneath the first electrode 110A and/or the second electrode 110B. Furthermore, the battery 100 may include additional acoustic wave devices, which may be disposed at a same and/or different location with the same and/or different orientation as the acoustic wave device 130.

The acoustic wave device 130 may be configured to generate a plurality of acoustic waves 150. According to some example embodiments, the acoustic wave device 130 may be configured to operate only when the battery 100 is being charged and susceptible to the formation of dendrites. For example, the charging of the battery 100 may activate the acoustic wave device 130. As such, the acoustic wave device 130 may generate the acoustic waves 150 only when the battery 100 is charging and cations are being deposited onto the anode of the battery 100. During this time, the electric current that is charging the battery 100 may also power the acoustic wave device 130.

Figure 8A:
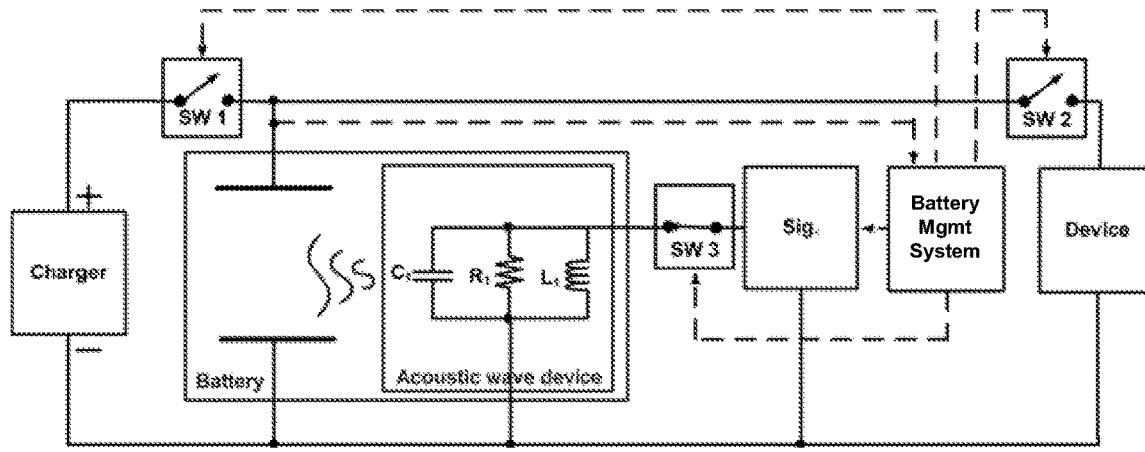
FIG. 8A depicts a circuit diagram illustrating a neutral state of a battery having an acoustic wave device, in accordance with some example embodiments.
Figure 8B:
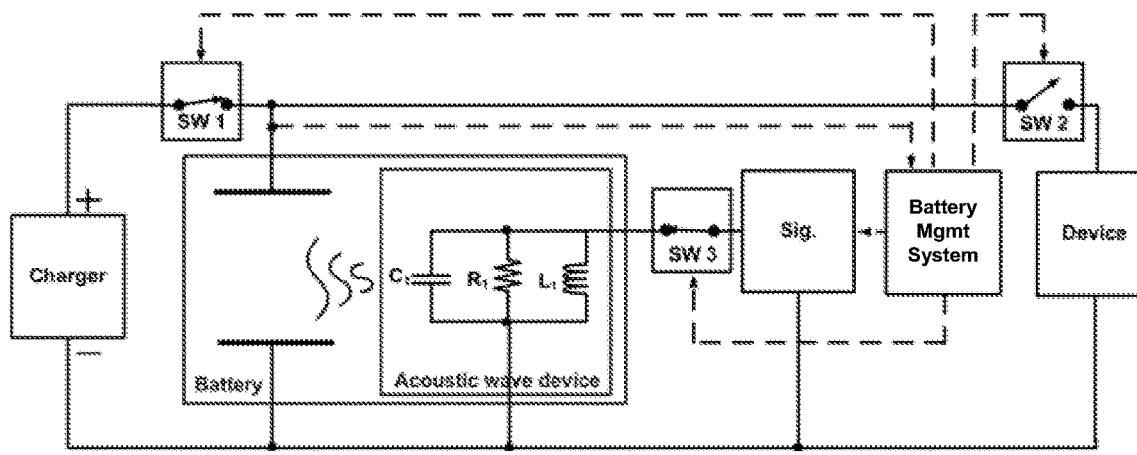
FIG. 8B depicts a circuit diagram illustrating a charging state of a battery having an acoustic wave device, in accordance with some example embodiments.
Figure 8C:
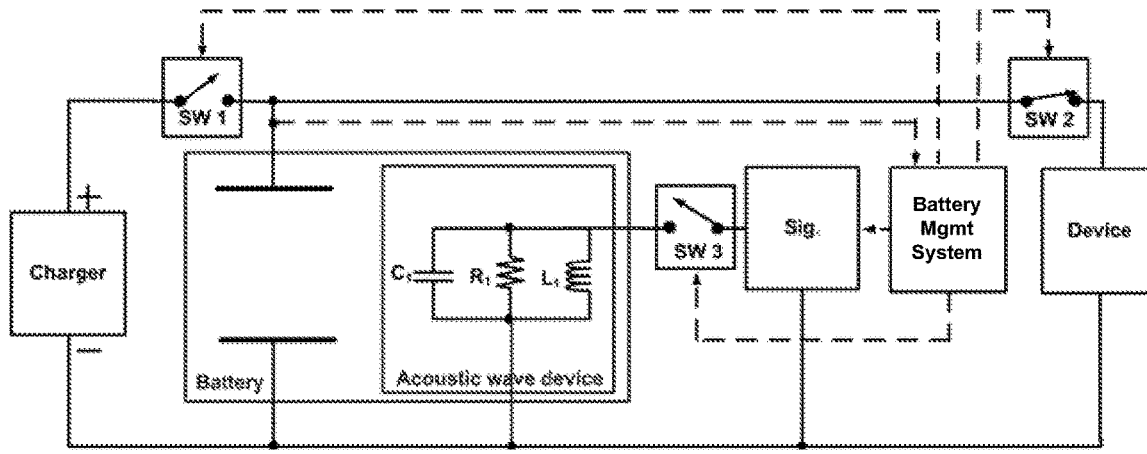
FIG. 8C depicts a circuit diagram illustrating a discharging state of a battery having an acoustic wave device, in accordance with some example embodiments.

FIG. 8A-C depicts circuit diagrams corresponding to the battery 100 having the acoustic wave device 130. The battery 100 may be represented by a pair of parallel plates having an internal resistance of R3. Meanwhile, the mechanical resonance of the acoustic wave device 130 may be represented by the resistance R1, the inductance L1, the capacitance C1, and the electrical capacitance C2. A battery management system may control the state of the battery 100, for example, via a first switch SW1 and/or a second switch SW2. Furthermore, the battery management system may also control the operations of the acoustic wave device 130, for example, via a third switch SW3.

Referring to FIG. 8A, the battery 100 may be in a neutral state when the battery 100 is not being charged or discharged. In the neutral state, both the first switch SW1 and the second switch SW2 may be open such that the battery 100 is neither not subject to a charging current or a discharge current. Nevertheless, the third switch SW3 may be closed to keep the acoustic wave device 130 activated in this state. Alternatively and/or additionally, the third switch SW3 may be open such that the acoustic wave device 130 is inactive while the battery 100 is in the neutral state.

FIG. 8B shows the battery 100 in a charging state. As shown in FIG. 8B, the battery management system may place the battery 100 in a charging state by at least closing the first switch SW1 and/or opening the second switch SW2. Furthermore, the battery management system may also activate the acoustic wave device 130 while the battery 100 is in the charging state, for example, by closing the third switch SW3. As noted, the acoustic wave device 130 may be activated during the charging of the battery 100 when the battery 100 is susceptible to the formation of dendrites. The operation of the acoustic wave device 130 may be powered by the electric current that is charging the battery 100.

FIG. 8C shows the battery 100 in a discharging state. As shown in FIG. 8C, the battery management system may place the battery 100 in a discharging state by at least opening the first switch SW1 and/or closing the second switch SW2. The battery management system may further open the third switch SW3 in order to deactivate the acoustic wave device 130 while the battery 100 is being discharged and is not susceptible to the formation of dendrites.

In some example embodiments, the acoustic waves 150 generated by the acoustic wave device 130 may propagate through an electrolyte 160 filling the interior of the battery 100 and surrounding the first electrode 110A and/or the second electrode 110B. The electrolyte 160 may be a gas, liquid, and/or semi-liquid (e.g., polymer jelly) electrolyte. For example, according to some example embodiments, the electrolyte 160 may have a viscosity that is less than and/or equal to 100 centipoise. The acoustic waves 150 generated by the acoustic wave device 130 may agitate the electrolyte 160, thereby homogenizing the distribution of cations in the electrolyte 160 as these cations migrate during the charging of the battery 100. As noted, homogenizing the distribution of the cations in the electrolyte 160 may decrease the concentration gradient of the cations in the electrolyte 160 such that the cations are distributed more evenly throughout the electrolyte 160. The homogenization of the distribution of the cations may increase the uniformity of the deposits of the cations on the first electrode 110A and/or the second electrode 110B.

Referring again to FIG. 1A, the acoustic wave device 130 may include a substrate 130A and a transducer 130B. The substrate 130A may be formed from a piezoelectric material such as, for example, lithium niobate ($LiNbO_3$), lithium titanate ($Li_2TiO_3$), barium titanate ($BaTiO_3$), lead zirconate titanate ($Pb(Zr_xTi_{1-x})O_3$ wherein ($0 \leq x \leq 1$)), quartz, aluminum nitride (MN), polyvinylidene fluoride (PVDF), and/or the like. Meanwhile, the transducer 130B may include one or more pairs of metallic interdigital transducers, a layer of conductive material (e.g., metal and/or the like), and/or one or more contact pins, which may be deposited onto the substrate 130A, for example, via ultraviolet photolithography and/or a different technique. It should be appreciated that the acoustic waves 150 generated by the acoustic wave device 130 may be any type of acoustic waves including, for example, surface acoustic waves (SAW), Lamb waves, flexural waves, thickness mode vibrations, mixed-mode waves, longitudinal waves, shear mode vibrations, bulk wave vibrations, and/or the like.

As shown in FIGS. 1A-B, the acoustic wave device 130 may be coupled with a signal generator 140. In some example embodiments, the signal generator 140 may provide, to the acoustic wave device 130, a sinusoidal electrical input signal. In some example embodiments, the transducer 130B may be configured to convert this sinusoidal electrical input signal into the acoustic waves 150. For example, the sinusoidal electrical input signal may create regions of alternating electric polarity within the transducer 130B. These regions of alternating electric polarity may apply tension and compression within and/or upon the substrate 130A. The tension and compression applied within and/or upon the substrate 130A may cause the substrate 130A to oscillate, thereby generating the acoustic waves 150.

In some example embodiments, the energy of the acoustic waves 150 may induce acoustic streaming in the electrolyte 160. Acoustic streaming may be a non-laminar and/or turbulent fluid flow, which may maximize the agitation of the electrolyte 160 and/or the homogenization of the distribution of the cations in the electrolyte 160. It should be appreciated that acoustic streaming may result from interplay between variations in a density of the electrolyte 160 and variations in a velocity of the electrolyte 160. A frequency of the acoustic waves 150, an amplitude of the acoustic waves 150, and/or the viscosity of the electrolyte 160 may determine whether the acoustic waves 150 are able to induce acoustic streaming in the electrolyte 160. Acoustic streaming may be achieved at lower frequencies of the acoustic waves 150, for example, when the viscosity of the electrolyte 160 is between a certain range. For instance, acoustic streaming may be induced in water, which may have a viscosity of 0.890 centipoise at 25° C., when the frequency of the acoustic waves 150 exceeds 1 megahertz (MHz).

In some example embodiments, the acoustic waves 150 may be associated with an attenuation length, which may be a distance from the source (e.g., the acoustic wave device 130) to which the acoustic waves 150 are able to propagate before the energy of the acoustic waves 150 dissipates into the electrolyte 160, thereby inducing, for example, fluid flow such as acoustic streaming. As used herein, the acoustic waves 150 may considered be attenuated when the amplitude of the acoustic waves 150 falls below a threshold value. The attenuation length of the acoustic waves 150 may be a function of the viscosity of the electrolyte 160 and/or the frequency of the acoustic waves 150. It should be appreciated that increasing the frequency $f_s$ of the acoustic waves 150 may decrease the attenuation length of the acoustic waves 150. As Equation (1) below indicates, the frequency $f_s$ of the acoustic waves 150 may be inversely proportional to a wavelength $\lambda_{AW}$ of the acoustic waves 150.

$$\lambda_{AW} = \frac{c_s}{f_s} \quad (1)$$

wherein $c_s$ may be the speed of sound traveling through the substrate 130A.

According to some example embodiments, the composition of the electrolyte 160 and/or the frequency $f_s$ of the acoustic waves 150 may be selected such that the attenuation length of the acoustic waves 150 correspond to one or more dimensions of the battery 100 and/or an anode of the battery 100. For example, the electrolyte 160 and/or the frequency $f_s$ of the acoustic waves 150 may be selected such that the attenuation length of the acoustic waves 150 is equal to and/or exceeds a length, a width, and/or a depth of the battery 100 and/or the anode of the battery 10. Alternatively and/or additionally, the wavelength $\lambda_{AW}$ of the acoustic waves 150 may be determined based on a porosity of a separator (not shown) interposed between the first electrode 110A and the second electrode 110B. For instance, the separator may ideally have a pore size that is greater than and/or equal to one half the wavelength $\lambda_{AW}$ of the acoustic waves 150. Furthermore, the magnitude (e.g., amplitude) of the acoustic waves 150 may be selected to prevent the acoustic waves 150 from disrupting the formation of a solid electrolyte interface (SEI) layer on the surface of the anode of the battery 100.

Figure 2A:
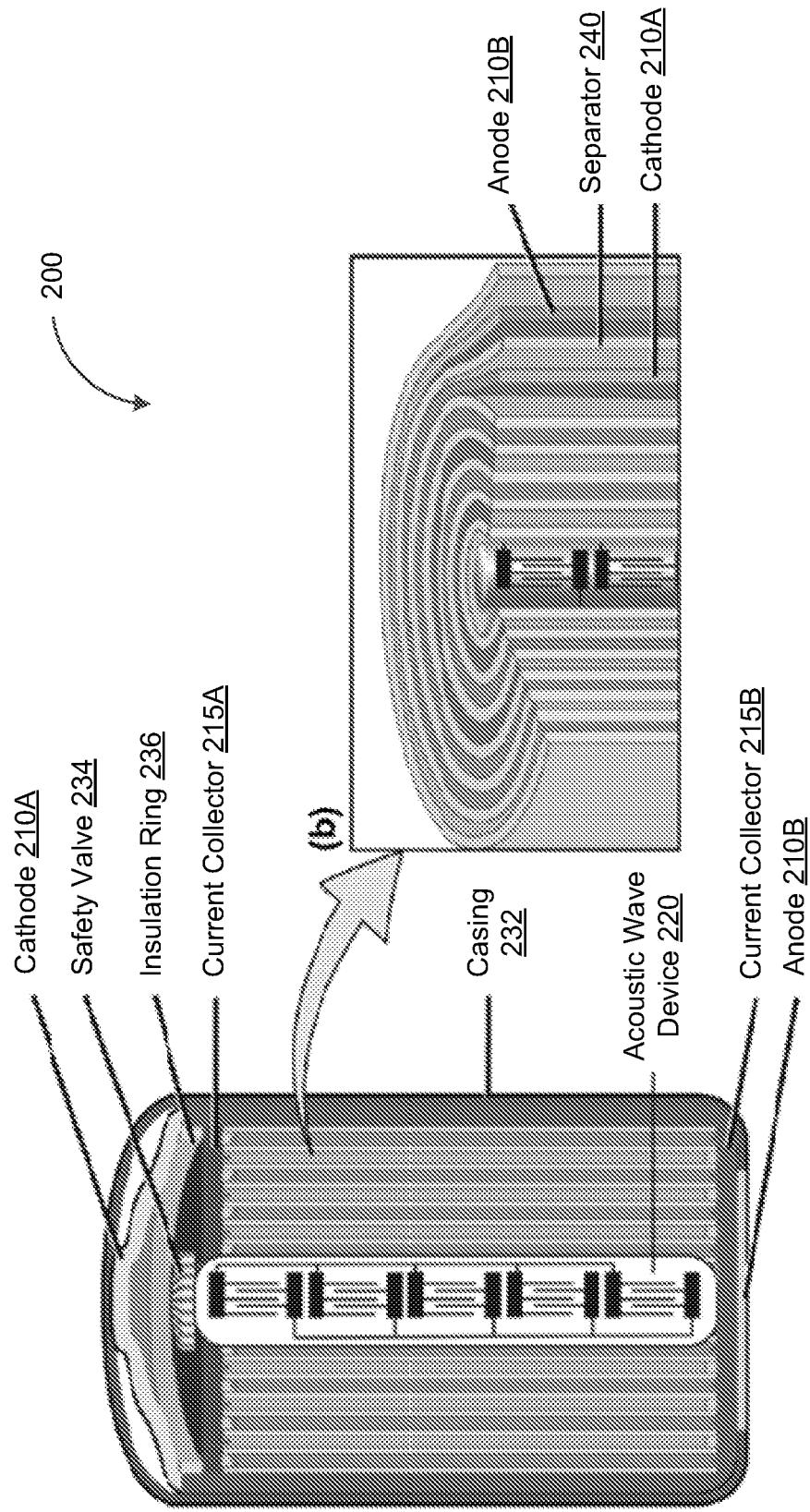
FIG. 2A depicts a cylindrical battery, in accordance with some example embodiments.

FIG. 2A depicts a cylindrical battery 200, in accordance with some example embodiments. The cylindrical battery 200 may be any type of battery including, for example, a lithium (Li) battery, a lithium-ion battery, a sodium (Na) battery, a potassium (K) battery, a magnesium (Mg) battery, a copper (Cu) battery, a sodium (Na) battery, a zinc (Zn) battery, and/or the like. Referring to FIG. 2A, the cylindrical battery 200 may include a cathode 210A and an anode 210B. The cathode 210A may be coupled with a first current collector 215A while the anode 210B may be coupled with a second current collector 215B. As shown in FIG. 2A, the cylindrical battery 200 may include a jelly-roll formed from a first layer of material for the cathode 210A, a second layer of material for a separator 240, and a third layer of material for the anode 210B. The jelly-roll may be enclosed in a casing 232. Furthermore, as shown in FIG. 2A, the cylindrical battery 200 may include a safety value 234 and an insulation ring 236.

In some example embodiments, the cylindrical battery 200 may include an acoustic wave device 220. Referring again to FIG. 2A, the acoustic wave device 220 may be disposed at a core of the jelly-roll structure formed by the cathode 210A, the anode 210B, and the separator 240. The acoustic wave device 220 may be configured to generate acoustic waves, for example, while the cylindrical battery 200 is being charged. These acoustic waves may propagate through an electrolyte (not shown) occupying the spiraling space between the cathode 210A and anode 210B. As noted, the acoustic waves may agitate the electrolyte, which may homogenize the distribution of cations within the electrolyte and increase the uniformity of the deposits of cations on the anode 210B.

Figure 2B:
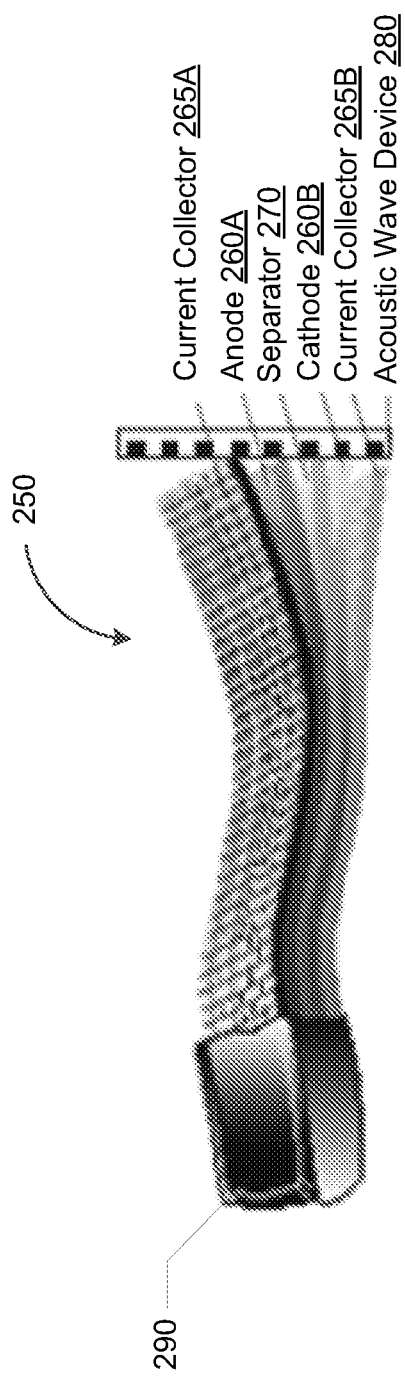
FIG. 2B depicts a prismatic battery, in accordance with some example embodiments.

FIG. 2B depicts a prismatic battery 250, in accordance with some example embodiments. The prismatic battery 250 may be any type of battery including, for example, a lithium (Li) battery, a sodium (Na) battery, a potassium (K) battery, and/or the like. Referring to FIG. 2B, the prismatic battery 250 may include an anode 260A and a cathode 260B. The anode 260A may be coupled with a first current collector 265A while the cathode 260B may be coupled with a second current collector 265B. A separator 270 may be interposed between the anode 260A and the cathode 260B. The first current collector 265A, the anode 260A, the separator 270, the cathode 260B, and the second current collector 265B may be stacked and enclosed within a casing 290 filled with an electrolyte (not shown). It should be appreciated that only a portion of the casing 290 is shown in FIG. 2B in order to reveal the inner composition of the prismatic battery 250.

In some example embodiments, the prismatic battery 250 may further include an acoustic wave device 280. As shown in FIG. 2B, the acoustic wave device 280 may be disposed at one end of the stack formed by the first current collector 265A, the anode 260A, the separator 270, the cathode 260B, and the second current collector 265B. The acoustic wave device 280 may generate acoustic waves that propagate through the electrolyte occupying the interior of the prismatic battery 250. These acoustic waves may agitate the electrolyte, thereby homogenizing the distribution of cations within the electrolyte and increasing the uniformity of the deposits of cations on the anode 210B.

It should be appreciated that an acoustic wave device may be integrated into a battery having any form factor. For example, the prismatic battery 250 may be a conformal battery configured to adapt to the shape, contours, and/or surface features of its surroundings. The orientation, location, number, and/or operation frequency of the acoustic wave device may be adjusted in order to effectively agitate electrolyte over the battery and/or battery electrodes, regardless of the form factor of the battery itself.

Figure 3A:
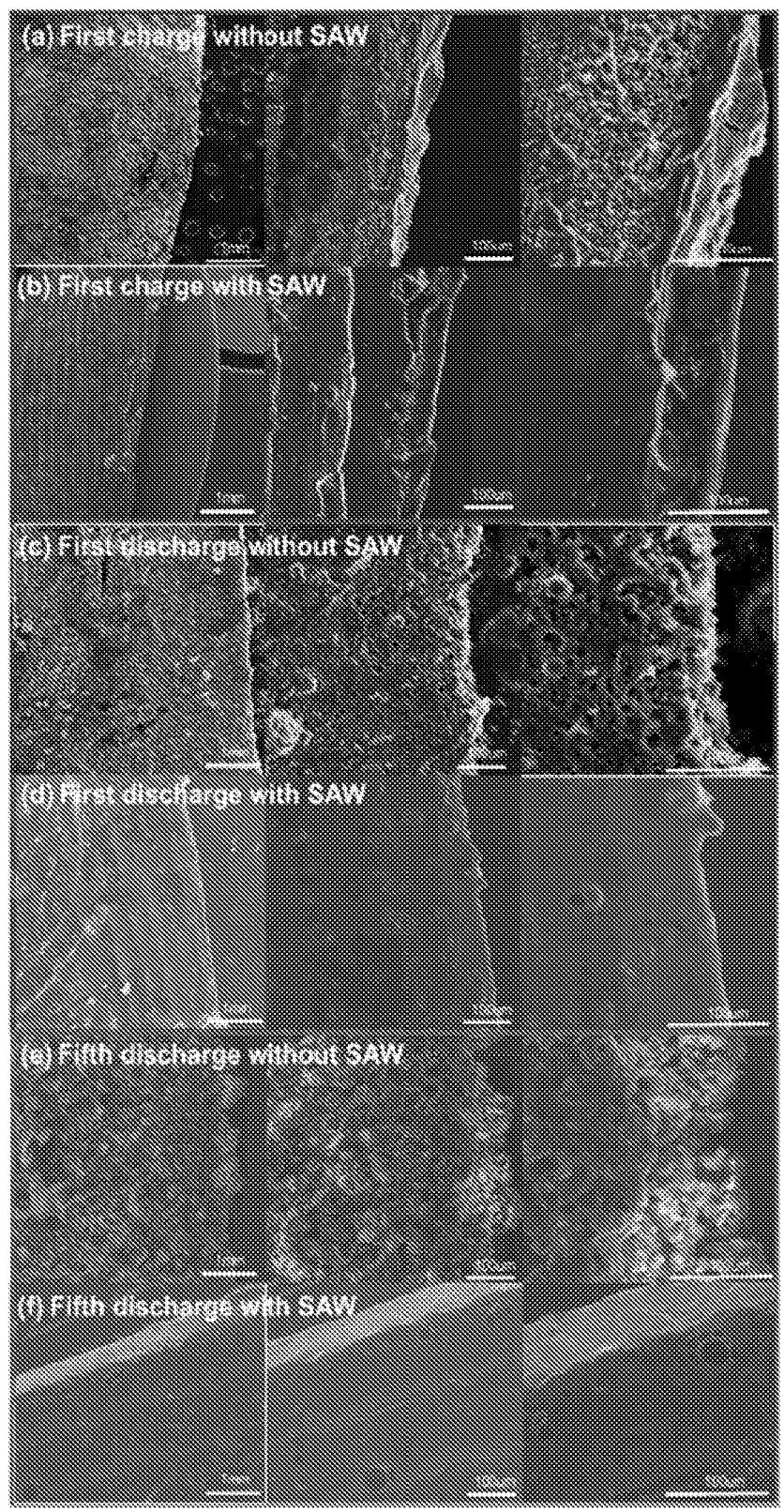
FIG. 3A depicts the different morphology of electrodes from batteries that have been charged both with and without acoustic waves, in accordance with some example embodiments.

FIG. 3A depicts the different morphology of electrodes from batteries have being charged both with and without acoustic waves, in accordance with some example embodiments. For example, FIG. 3A depicts the surface of an anode of a battery that was charged in the presence of acoustic waves and the surface of an anode of a battery that was charged in the absence of acoustic waves. As shown in FIG. 3A, dendrites may begin forming on the surface of the anode after the battery is subject to just a single charge cycle without any acoustic waves and may grow substantially by the time the battery has been subject to five charge cycles. By contrast, the surface of the anode of the battery that is charged in the presence of acoustic waves shows minimal dendrite formation even after five charge cycles.

Figure 3B:
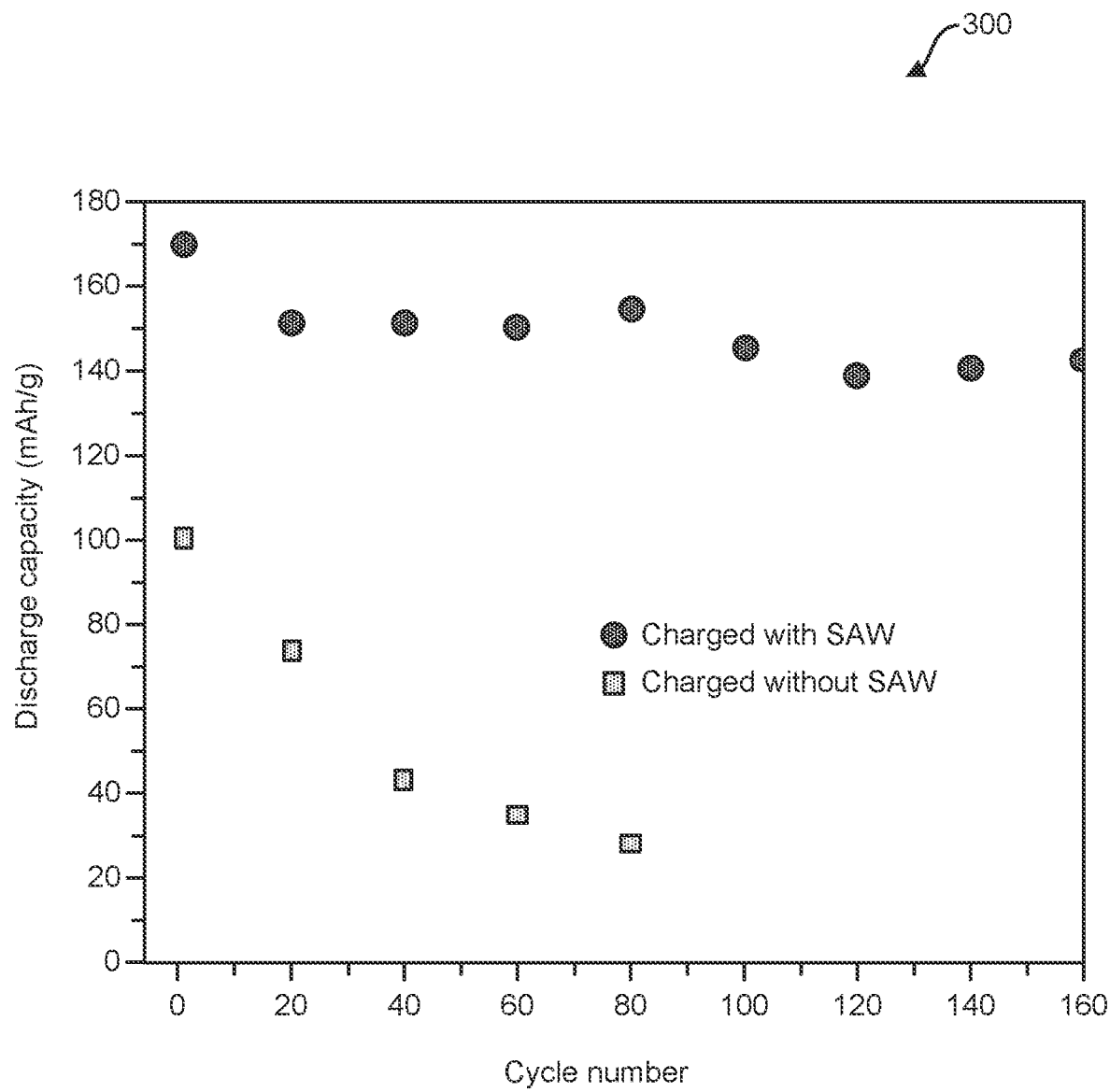
FIG. 3B depicts a graph illustrating a discharge capacity of batteries charged with and without acoustic waves, in accordance with some example embodiments.

FIG. 3B depicts a graph 300 illustrating a discharge capacity of batteries charged with and without acoustic waves, in accordance with some example embodiments. As noted, the formation of dendrite may reduce a battery's discharge capacity. As such, charging a battery in the presence of acoustic waves, which prevents the formation of dendrites, may further preserve the battery's discharge capacity.

Referring to FIG. 3B, the graph 300 shows the discharge capacity (e.g., milliampere hours per gram (mAh/g)) of the batteries relative to a number of charge cycles that the batteries are subject to. As shown in FIG. 3B, a battery that is charged in the absence of acoustic waves exhibits a precipitous decline in discharge capacity as the battery is subject to more charge cycles. For instance, by the time the battery is subject to its fortieth charge cycle, the discharge capacity of the battery has diminished to only about 40% (e.g., 40 milliampere hours per gram) of its initial discharge capacity (e.g., 100 milliampere hours per gram). By contrast, the discharge capacity of a battery that is charged in the presence of acoustic waves remains stable even after the battery is subject to a large number of charge cycles. For example, as shown in FIG. 3B, the discharge capacity of the battery charged in the presence of acoustic waves was preserved for at least 160 charge cycles.

Figure 3C:
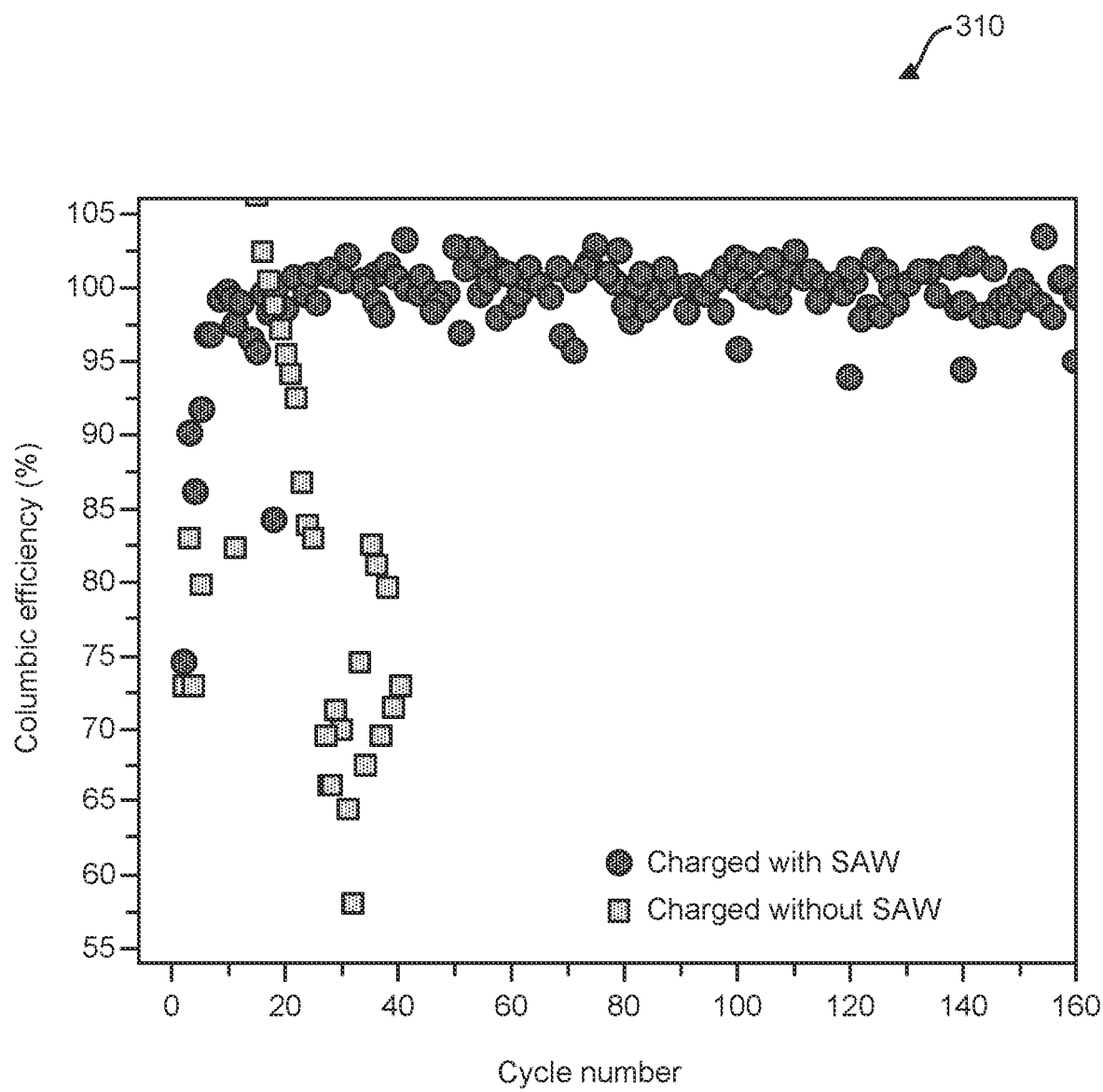
FIG. 3C depicts a graph illustrating the Columbic efficiency of batteries charged with and without acoustic waves, in accordance with some example embodiments.

FIG. 3C depicts a graph 310 illustrating a Columbic efficiency of batteries charged with and without acoustic waves, in accordance with some example embodiments. The Columbic efficiency of a battery may correspond to a quantity of charge output by the battery relative to a quantity of charge input into the battery, for example, during a charge cycle. It should be appreciated that preventing the formation of dendrites during charge cycles may also preserve a battery's Columbic efficiency.

Referring to FIG. 3C, the graph 310 shows the Columbic efficiency of the batteries relative to a number of charge cycles the batteries are subject to. As shown in FIG. 3C, the Columbic efficiency of a battery that is charged in the absence of acoustic waves declines significantly even after a few charging cycles. By contrast, the Columbic efficiency of a battery that is charged in the presence of acoustic waves remains steady even after the battery is subject to a large number of charge cycles.

The morphology of the interior of a battery may affect the operations of the battery. For example, the battery may be unable to operate safely when dendrites and/or air bubbles are present within the battery, for example, on a surface of one or more electrodes of the battery. As such, in some example embodiments, the operation of the battery may be controlled based on the morphology of the interior of the battery including, for example, the morphology of the surface of the electrodes of the battery.

In some example embodiments, the morphology of the interior of the battery may be determined based at least on a feedback signal formed by a reflection of one or more acoustic waves being reflected off the surface of the electrodes of the battery. For example, an acoustic wave device may be configured to generate one or more acoustic waves while the battery is being discharged. These acoustic waves may propagate, through an electrolyte filling the interior of the battery, toward the one or more electrodes of the battery before being reflected off of the surface of the one or more electrodes. According to some example embodiments, the acoustic wave device may be further configured to detect the feedback signals formed by the reflection of these acoustic waves off the surface of the one or more electrodes.

As noted, the acoustic wave device may exhibit piezoelectric properties. For example, the acoustic wave device may include a transducer (e.g., one or more pairs of metallic interdigital transducers, a layer of conductive material, contact pins, and/or the like) deposited on a substrate formed from a piezoelectric material. As such, the acoustic wave device may generate the plurality of acoustic waves by at least converting an electrical signal into mechanical energy embodied by the acoustic waves. Furthermore, the acoustic wave device may detect the feedback signals by at least converting mechanical energy from the feedback signals into an electrical signal. However, it should be appreciated that instead of and/or in addition to the acoustic wave device, a different detector may be used to detect the feedback signals.

Figure 4:
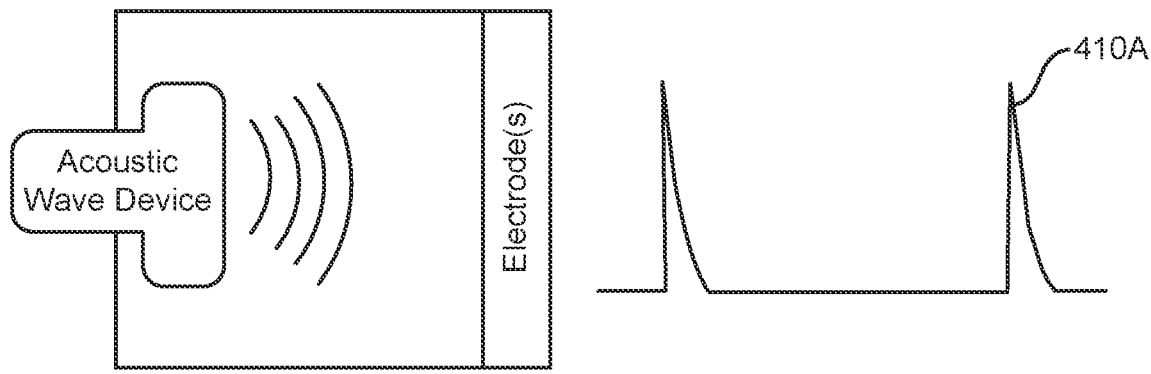
FIG. 4 depicts feedback signals corresponding to different electrode surface morphologies, in accordance with some example embodiments.
Figure 4:
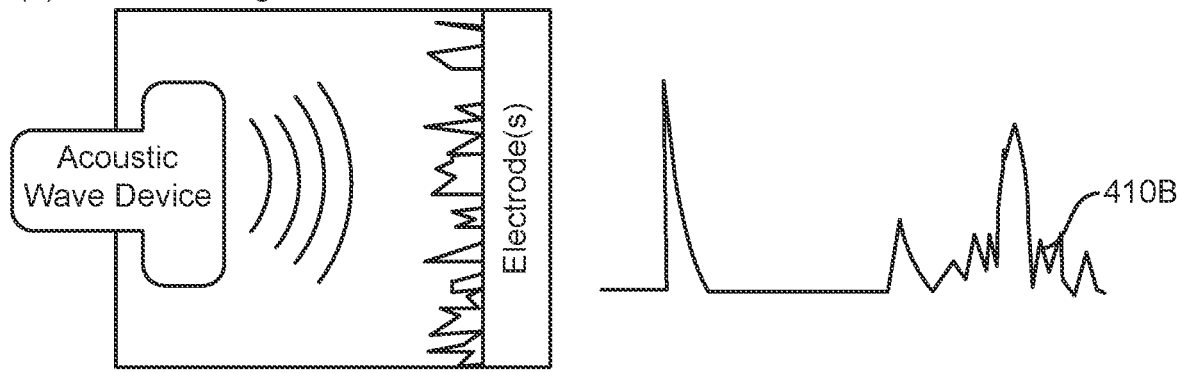
Figure 4:
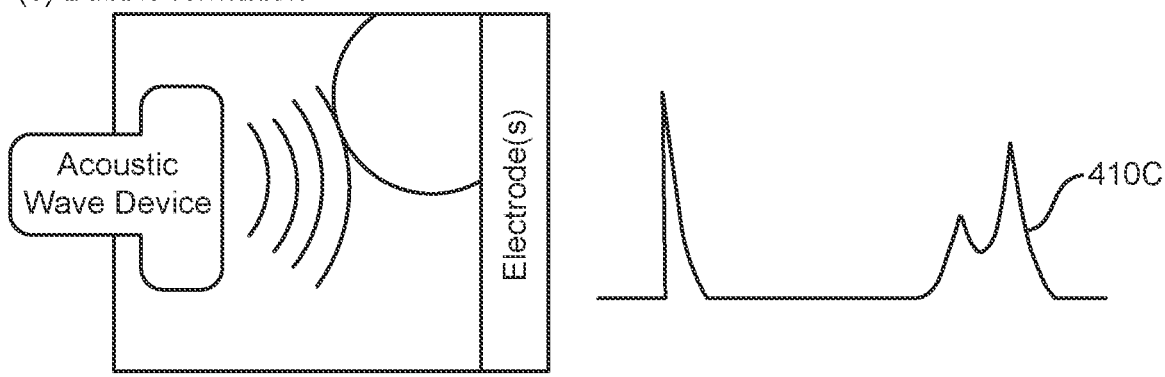

To further illustrate, FIG. 4 depicts feedback signals corresponding to different electrode surface morphology, in accordance with some example embodiments. In some example embodiments, different feedback signals may be detected depending on the surface morphology of one or more electrodes of a battery. As shown in FIG. 4, a first feedback signal 410A may be detected when the one or more electrodes of the battery have a smooth surface, for example, that is free from dendrites and/or air bubbles. A second feedback signal 410B may be detected when dendrites are present on the surface of the electrodes. Alternatively and/or additionally, a third feedback signal 410C may be detected when one or more air bubbles have formed on the surface of the electrodes.

Figure 5:
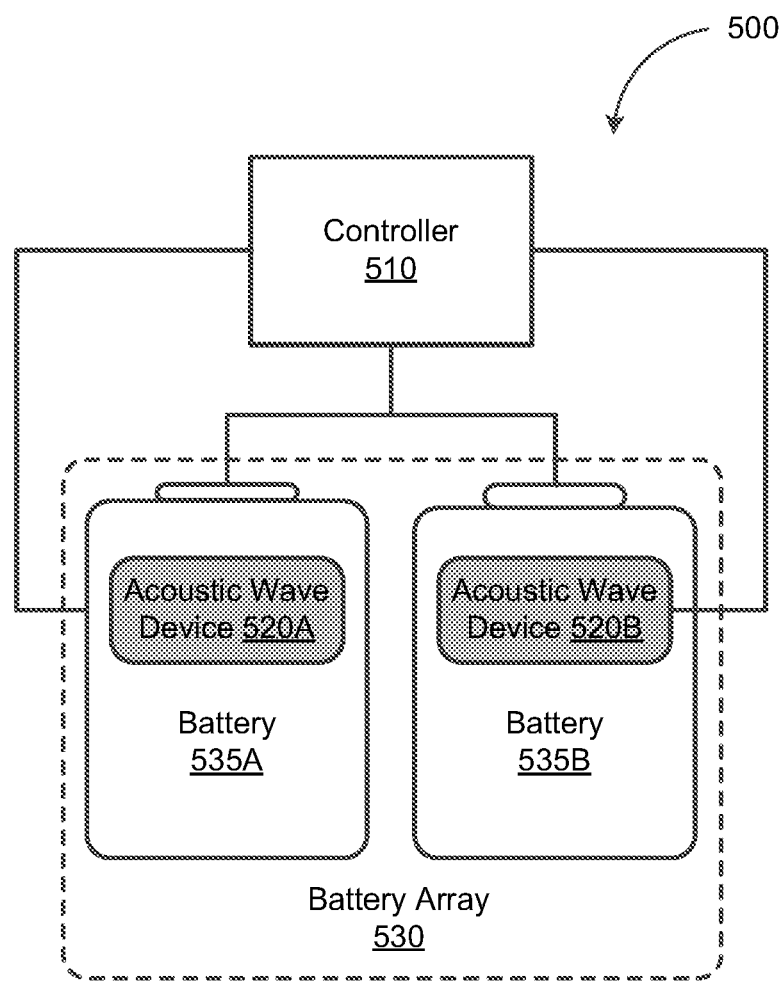
FIG. 5 depicts a block diagram illustrating a battery management system, in accordance with some example embodiments.

FIG. 5 depicts a block diagram illustrating a battery management system 500, in accordance with some example embodiments. Referring to FIG. 5, the battery management system 500 may include a controller 510 coupled with one or more acoustic wave devices including, for example, a first acoustic wave device 520A and/or a second acoustic wave device 520B. The first acoustic wave device 520A may be deployed at a first battery 535A while the second acoustic wave device 520B may be deployed at a second battery 535B. The first battery 535A and/or the second battery 535B may form a battery array 530.

In some example embodiments, the first acoustic wave device 520A may be configured to generate, during the discharge of the first battery 535A, one or more acoustic waves, which may propagate through an electrolyte filling an interior of the first battery 535A and form feedback signals when the acoustic waves are reflected off a surface of the one or more electrodes forming the first battery 535A. The first acoustic wave device 520A may detect the feedback signals. As noted, the feedback signals may indicate the morphology of the surface of the one or more electrodes of the first battery 535A. Referring to FIG. 4, the first acoustic wave device 520A may detect the first feedback signal 410A if the surface of the electrodes are smooth, the second feedback signal 410B if dendrites are present on the surface of the electrodes, and/or the third feedback signal 410C if air bubbles have formed on the surface of the electrodes.

Alternatively and/or additionally, the second acoustic wave device 520B may also be configured to generate, during the discharge of the second battery 535B, one or more acoustic waves, which may propagate through an electrolyte filling an interior of the second battery 535B. The second acoustic wave device 520B may detect the feedback signals formed by the reflection of these acoustic signals off a surface of the one or more electrodes forming the second battery 535B. These feedback signals may indicate the morphology of the surface of the electrodes of the second battery 535B.

According to some example embodiments, the controller 510 may be configured to control an operation of the first battery 535A based on the surface morphology of the electrodes of the first battery 535A. Alternatively and/or additionally, the controller 510 may also control an operation of the second battery 535B based on the surface morphology of the electrodes of the second battery 535B. For example, the controller 510 may terminate an operation of the first battery 535A when the feedback signals detected by the first acoustic wave device 520A indicate the presence of dendrites and/or air bubbles on the surface of the electrodes of the first battery 535A. The controller 510 may also terminate an operation of the second battery 535B if the feedback signals detected by the second acoustic wave device 520B indicate the presence of dendrites and/or air bubbles on the surface of the electrodes of the second battery 535B. Alternatively and/or additionally, the controller 510 may terminate the operation of the first battery 535A and/or the second battery 535B if the feedback signals indicate the presence of detached lithium dendrites (e.g., dead lithium), a breakage of the solid electrolyte interphase layer, and/or a formation of a protective polymer on the first acoustic wave device 520A and/or the second acoustic wave device 520B. As noted, a battery may be unable to operate safely under these conditions. Accordingly, it should be appreciated that the controller 510 may terminate the operation of a battery that have developed dendrites, air bubbles, detached dendrites, solid electrolyte interface breakage, protective polymer, and/or the like, in order to eliminate the hazard of operating such a battery.

In some example embodiments, terminating the operation of the battery may include, for example, ceasing a discharge of the battery by at least electrically decoupling the battery from an electric load of the battery. Alternatively and/or additionally, the controller 510 may terminate the operation of one or more individual batteries by at least electrically decoupling these individual batteries from other batteries in a same battery array. For example, as shown in FIG. 5, the controller 510 may terminate the operation of the first battery 535A by at least electrically decoupling the first battery 535A from the second battery 535B, which is part of the same battery array 530. In doing so, other batteries in the battery array 530 including, for example, the second battery 535B, may continue to operate but without the hazard posed by operating the first battery 535A.

Figure 6A:
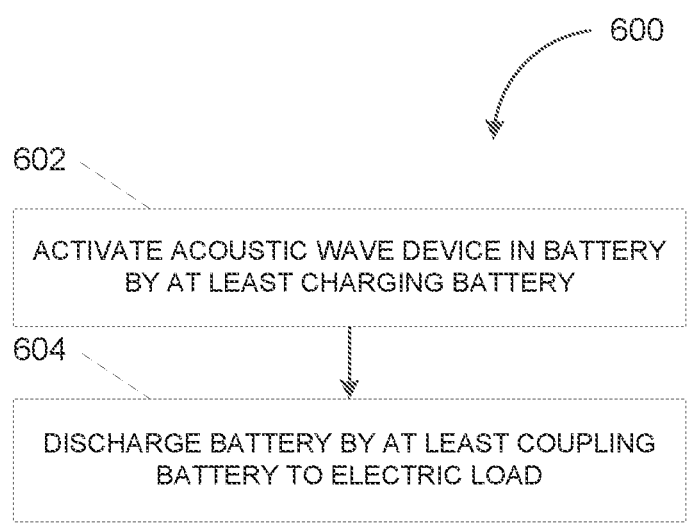
FIG. 6A depicts a flowchart illustrating a process for dendrite prevention, in accordance with some example embodiments.

FIG. 6A depicts a flowchart illustrating a process 600 for dendrite prevention, in accordance with some example embodiments. Referring to FIG. 6A, the process 600 may be performed with respect to a battery having an acoustic wave device. For example, the process 600 may be performed with respect to the battery 100, which includes the acoustic wave device 130. However, it should be appreciated that the process 600 may be performed with respect to any battery having an acoustic wave device including, for example, the cylindrical battery 200, the prismatic battery 250, and/or the like.

At 602, the acoustic wave device 130 in the battery 100 may be activated by at least charging the battery 100. In some example embodiments, the acoustic wave device 130 may be configured to generate the acoustic waves 150 only while the battery 100 is being charged. As such, charging the battery 100 may activate the acoustic wave device 130. The resulting acoustic waves 150 may propagate through the electrolyte 160 in the interior of the battery 100. These acoustic waves 150 may agitate the electrolyte 160, thereby homogenizing the distribution of cations in the electrolyte 160 as these cations migrate during the charging of the battery 100. Homogenizing the distribution of cations in the electrolyte 160 may increase the uniformity of the distribution of cations throughout the electrolyte 160 as well as the uniformity of the deposits of cations on the anode of the battery 100. As such, homogenizing the distribution of cations in the electrolyte 160 may prevent the formation of dendrites on the anode.

At 604, the battery 100 may be discharged by at least coupling the battery 100 to an electric load. For example, coupling the battery 100 to an electric load may cause the battery 100 to discharge. As noted, during the discharge of the battery 100, atoms at the anode of the battery 100 may oxidize to form cations and free electrons. The migration of free electrons from the anode to the cathode of the battery 100 may generate an electric current powering the electric load coupled with the battery 100. Meanwhile, the cations may also migrate through the electrolyte 160 from the anode to the cathode. These cations may subsequently return to the anode of the battery 100 when the battery 100 is subject to another charge cycle.

Figure 6B:
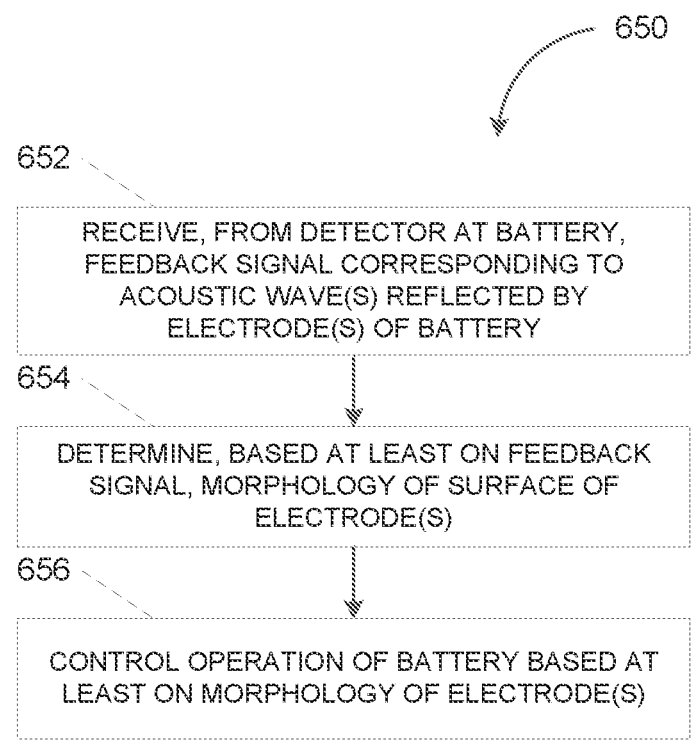
FIG. 6B depicts a flowchart illustrating a process for battery management, in accordance with some example embodiments.

FIG. 6B depicts a flowchart illustrating a process 650 for battery management, in accordance with some example embodiments. Referring to FIG. 6B, the process 650 may be performed by the battery management system 500, for example, by the controller 510.

At 652, the controller 510 may receive, from the first acoustic wave device 520 at the first battery 535A, a feedback signal formed at least in part by a reflection of one or more acoustic wave off one or more electrodes of the first battery 535A. In some example embodiments, the one or more electrodes of the first battery 535A may at least partially reflect the acoustic waves generated by the first acoustic wave device 520A, for example, during a discharge of the first battery 535A. The first acoustic wave device 520A may be configured to detect the feedback signal that results from these acoustic waves being at least partially reflected by the one or more electrodes of the first battery 535A.

At 654, the controller 510 may determine, based at least on the feedback signal, a morphology of a surface of the one or more electrodes of the first battery 535A. As shown in FIG. 4, different feedback signals may indicate different morphologies on an interior of a battery. For instance, the first acoustic wave device 520A may detect the first feedback signal 410A when the surface of the one or more electrodes is smooth (e.g., free from dendrites and/or air bubbles). Meanwhile, the first acoustic wave device 520A may detect the second feedback signal 410B when dendrites are present on the surface of the one or more electrodes. Alternatively and/or additionally, the first acoustic wave device 520A may detect the third feedback signal 410C when one or more air bubbles are present on the surface of the electrodes. Furthermore, the first acoustic wave device 520A may detect other feedback signals indicative of the presence of detached dendrites, the breakage of a solid electrolyte interphase layer, and/or the formation of a protective polymer on the first acoustic wave device 520A.

At 656, the controller 510 may control an operation of the first battery 535A based at least on the morphology of the interior of the first battery 535A. For example, the controller 510 may terminate the operation of the first battery 535A when the feedback signals detected by the first acoustic wave device 520A indicate a presence of dendrites, air bubbles, detached dendrites, solid electrolyte interphase layer breakage, protective polymer, and/or the like, within the first battery 535A. In some example embodiments, terminating the operation of the first battery 535A may include ceasing a discharge of the first battery 535A by at least electrically decoupling the first battery 535A from an electric load of the first battery 535A. Alternatively and/or additionally, terminating the operation of the first battery 535A may include electrically decoupling the first battery 535A from the other batteries, such as the second battery 520B, that are part of the same battery array 530. Electrically decoupling the first battery 535A from the second battery 535B in the same battery array 530 may allow the second battery 535B to continue to operate without the hazard posed by the first battery 535A.

Figure 7:
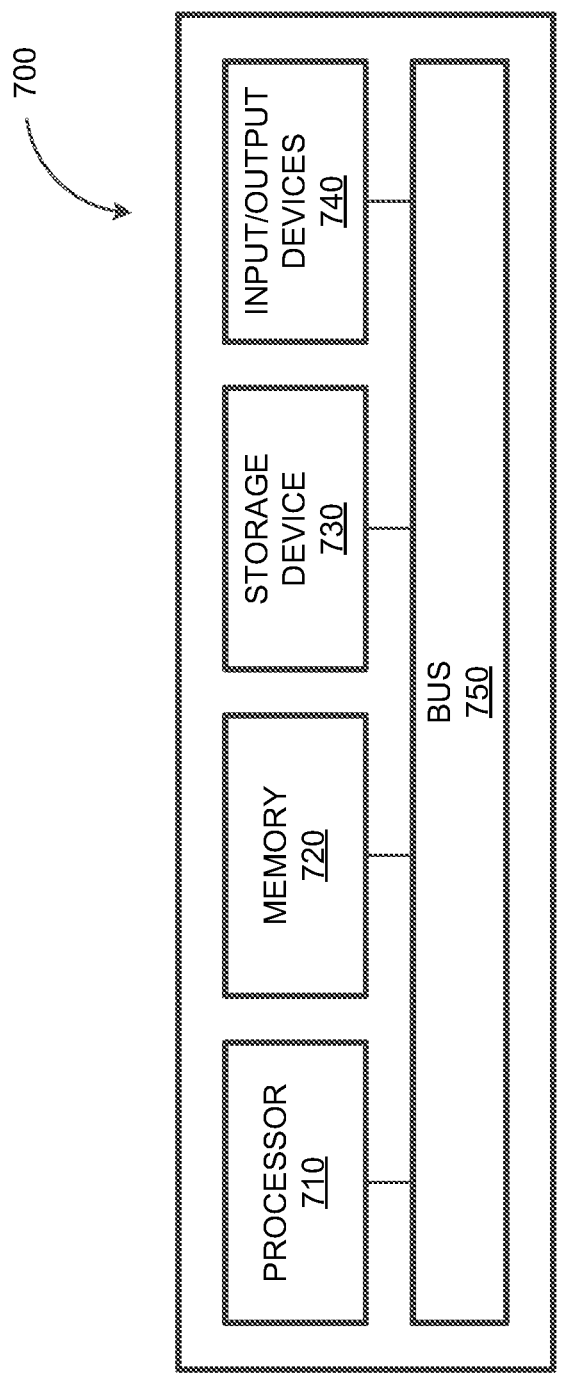
FIG. 7 depicts a block diagram illustrating a computing system, in accordance with some example embodiments.

FIG. 7 depicts a block diagram illustrating a computing system 700 consistent with implementations of the current subject matter. Referring to FIGS. 1-7, the computing system 700 can be used to implement the controller 510 and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the controller 510. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A battery, comprising:
   a first electrode;
   a second electrode;
   an electrolyte interposed between the first electrode and the second electrode; and
   at least one acoustic wave device configured to generate a plurality of acoustic waves during a charging of the battery, the at least one acoustic wave device comprising a transducer deposited on a substrate, the transducer responding to an electrical input signal by at least applying tension and compression within and/or upon the substrate, the substrate responding to the tension and the compression by at least oscillating to generate the plurality of acoustic waves, the charging of the battery triggering cations from the first electrode to travel through the electrolyte and deposit on the second electrode, the plurality of acoustic waves agitating the electrolyte to at least homogenize a distribution of cations in the electrolyte, and the homogenization preventing a formation of dendrites on the second electrode by at least increasing a uniformity of the deposit of cations on the second electrode.

2. The battery of claim 1, wherein the plurality of acoustic waves induces acoustic streaming within the electrolyte, and wherein the acoustic streaming further agitates the electrolyte to homogenize the distribution of the cations in the electrolyte.

3. The battery of claim 1, wherein the homogenization decreases a concentration gradient of the cations in the electrolyte and increases a uniformity of the distribution of the cations in the electrolyte.

4. The battery of claim 1, wherein the plurality of acoustic waves comprises surface acoustic waves, Lamb waves, flexural waves, thickness mode vibrations, mixed-mode waves, longitudinal waves, shear mode vibrations, and/or bulk wave vibrations.

5. The battery of claim 1, wherein the battery comprises a cylindrical battery, wherein a separator is interposed between the first electrode and the second electrode, wherein the first electrode, the second electrode, and the separator are configured to form a jelly-roll structure, and wherein the at least one acoustic wave device is disposed at a core of the jelly-roll structure.

6. The battery of claim 1, wherein the at least one acoustic wave device is disposed at a side of the first electrode and/or the second electrode.

7. The battery of claim 1, wherein the at least one acoustic wave device is disposed above and/or beneath the first electrode and/or the second electrode.

8. The battery of claim 1, wherein the charging of the battery activates the at least one acoustic wave device to at least generate the plurality of acoustic waves.

9. The battery of claim 1, wherein the at least one acoustic wave device is inactive during a discharge of the battery.

10. The battery of claim 1, wherein the electrolyte comprises a gas and/or a liquid.

11. The battery of claim 1, wherein the battery comprises a lithium (Li) battery, a lithium-ion battery, a potassium (K) battery, a magnesium (Mg) battery, a copper (Cu) battery, a zinc (Zn) battery, a sodium (Na) battery, and/or a potassium (K) battery.

12. The battery of claim 1, wherein the first electrode and/or the second electrode comprises a metal electrode, a cation-intercalated composite electrode, an air electrode, a graphite electrode, a graphene electrode, a lithium-intercalated carbon electrode, a lithium-intercalated silicone electrode, a sulphur electrode, a tungsten electrode, a silicon electrode, a nitride electrode, a vanadium oxide electrode, and/or a lithium excess electrode.

13. The battery of claim 1, wherein the transducer comprises one or more pairs of interdigital transducers, a layer of conductive material, and/or one or more contact pins.

14. The battery of claim 1, wherein the substrate is formed from at least a piezoelectric material.

15. The battery of claim 1, wherein a frequency of the plurality of acoustic waves corresponds to an attenuation length of the plurality of acoustic waves, and wherein the attenuation length corresponds to one or more dimensions of the battery, the first electrode, and/or the second electrode.

16. The battery of claim 1, further comprising:
a separator having a pore size greater than or equal to one half of a wavelength of the plurality of acoustic waves.

17. The battery of claim 1, wherein the plurality of acoustic waves have an amplitude that preserves a solid electrolyte interface layer formed on a surface of the first electrode and/or the second electrode.

18. The battery of claim 1, wherein the plurality of acoustic waves are at least partially reflected off a surface of the first electrode and/or the second electrode, and wherein the acoustic wave device is further configured to detect a feedback signal corresponding to the reflection of the plurality of acoustic waves.

19. The battery of claim 18, wherein the battery is coupled with a controller configured to at least:
determine, based at least on the feedback signal, a morphology of an interior of the battery; and
control, based at least on the morphology, an operation of the battery, the controlling includes terminating the operation of the battery in response to the feedback signal indicating a presence of dendrites and/or air bubbles on the surface of the first electrode and/or the second electrode.

* * * * *